(12) United States Patent
Goldstein

(10) Patent No.: US 10,801,700 B2
(45) Date of Patent: Oct. 13, 2020

(54) DEVICES, SYSTEMS AND METHODS FOR VARYING BEAM STRUCTURES

(71) Applicant: SIGNIFY HOLDING B.V., Eindhoven (NL)

(72) Inventor: Peter Isaac Goldstein, Eindhoven (NL)

(73) Assignee: Signify Holding B.V., Eindhoven (NL)

(*) Notice: Subject to any disclaimer, the term of this patent is extended or adjusted under 35 U.S.C. 154(b) by 0 days.

(21) Appl. No.: 16/462,301

(22) PCT Filed: Nov. 24, 2017

(86) PCT No.: PCT/EP2017/080387
§ 371 (c)(1),
(2) Date: May 20, 2019

(87) PCT Pub. No.: WO2018/099826
PCT Pub. Date: Jun. 7, 2018

(65) Prior Publication Data
US 2019/0368690 A1    Dec. 5, 2019

Related U.S. Application Data

(60) Provisional application No. 62/427,768, filed on Nov. 29, 2016.

(30) Foreign Application Priority Data

Dec. 19, 2016 (EP) ..................... 16204923

(51) Int. Cl.
*F21V 14/06* (2006.01)
*F21V 3/00* (2015.01)
(Continued)

(52) U.S. Cl.
CPC ............... *F21V 14/06* (2013.01); *F21V 3/00* (2013.01); *F21V 5/008* (2013.01); *F21V 5/04* (2013.01);
(Continued)

(58) Field of Classification Search
CPC . F21V 14/06; F21V 3/00; F21V 5/008; F21V 5/04; G02B 27/0927;
(Continued)

(56) References Cited

U.S. PATENT DOCUMENTS 3,751,138 A    8/1973  Humphrey
6,016,038 A    1/2000  Mueller et al.
(Continued)

FOREIGN PATENT DOCUMENTS

CN    104487135 A    4/2015
DE    102013101711 A1   8/2014
(Continued)

OTHER PUBLICATIONS

S. Barbero et al, IOP Publishing, "Adjustable-focus lenses based on the Alvarez principle", Journal of Optics, Opt. 13 (2011) 125705 (11pp). doi:10.1088/2040-8978/13/12/125705.
(Continued)

*Primary Examiner* — Donald L Raleigh
(74) *Attorney, Agent, or Firm* — Daniel J. Piotrowski

(57) ABSTRACT

Devices, systems and methods for providing an output beam are disclosed. The devices, systems and methods can employ a light source (802) configured to output light and a plurality of lenses (702). The lenses include a first lens (704) having a first freeform surface configured to receive the light and a second freeform surface configured to transmit the light towards a second lens (706) of the plurality of lenses. The second lens (706)5 includes a third freeform surface configured to receive the light from the second freeform surface and includes a fourth freeform surface configured to transmit the light out of the second lens.

15 Claims, 8 Drawing Sheets

(51) Int. Cl.
  *F21V 5/00* (2018.01)
  *F21V 5/04* (2006.01)
  *G02B 27/09* (2006.01)
  *G02B 27/30* (2006.01)
  *F21Y 115/10* (2016.01)

(52) U.S. Cl.
  CPC ..... *G02B 27/0927* (2013.01); *G02B 27/0961* (2013.01); *G02B 27/30* (2013.01); *F21Y 2115/10* (2016.08)

(58) Field of Classification Search
  CPC .. G02B 27/0961; G02B 27/30; G02B 3/0081; F21Y 2115/10
  See application file for complete search history.

(56) References Cited

U.S. PATENT DOCUMENTS

| | | | |
|---|---|---|---|
| 6,211,626 B1 | 4/2001 | Lys et al. | |
| 7,401,947 B2* | 7/2008 | Wanninger | F21S 48/1154 362/300 |
| 9,261,702 B2 | 2/2016 | Chan | |
| 2002/0101666 A1* | 8/2002 | Togino | G02B 15/04 359/720 |
| 2011/0032707 A1* | 2/2011 | Takashige | F21V 5/04 362/277 |
| 2011/0222301 A1* | 9/2011 | Knoedgen | B60Q 1/076 362/467 |
| 2013/0077332 A1* | 3/2013 | Hessling | B64D 47/06 362/470 |
| 2016/0018626 A1* | 1/2016 | Hou | G02B 15/16 359/691 |
| 2016/0219269 A1* | 7/2016 | Tekolste | G02B 5/1814 |

FOREIGN PATENT DOCUMENTS

| | | |
|---|---|---|
| EP | 0187177 A1 | 7/1986 |
| EP | 0328930 A2 | 8/1989 |
| WO | 2013120800 A1 | 8/2013 |
| WO | 2016024161 A2 | 2/2016 |

OTHER PUBLICATIONS

Sergio Barbero, "The Alvarez and Lohmann refractive lenses revisited", Optics Express 9376, vol. 17, No. 11, May 25, 2009.

* cited by examiner

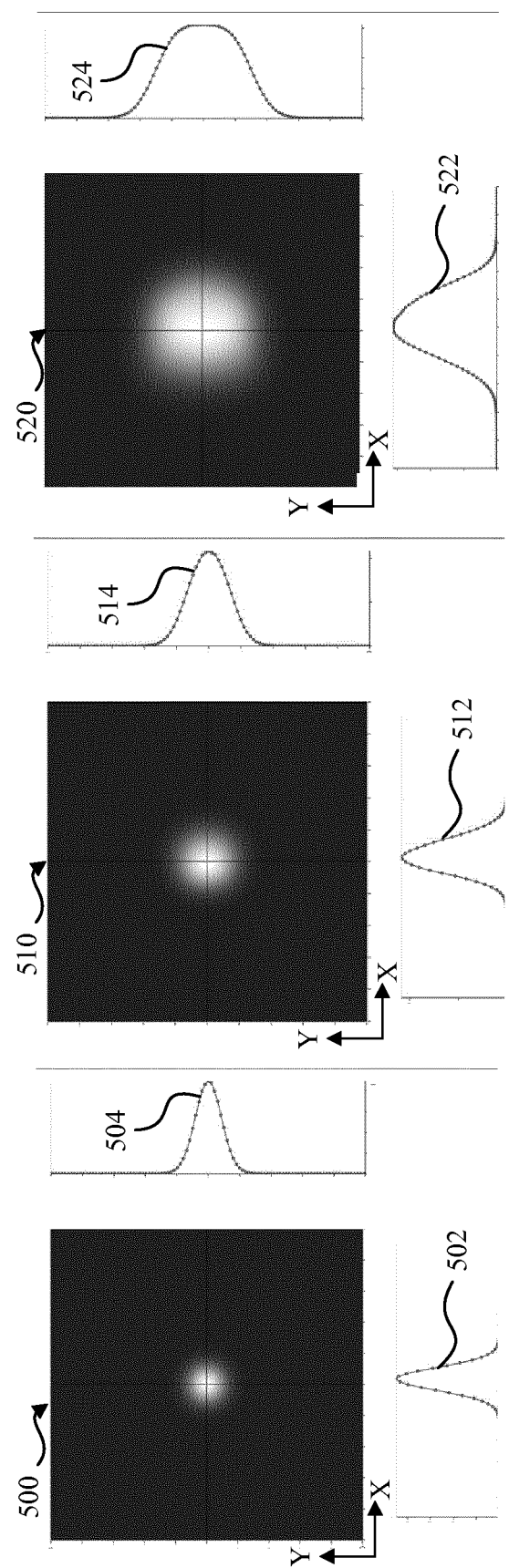

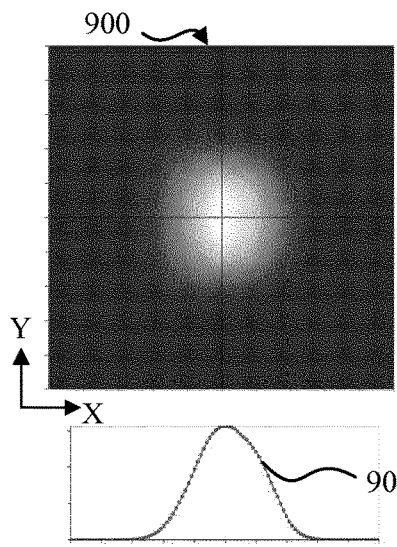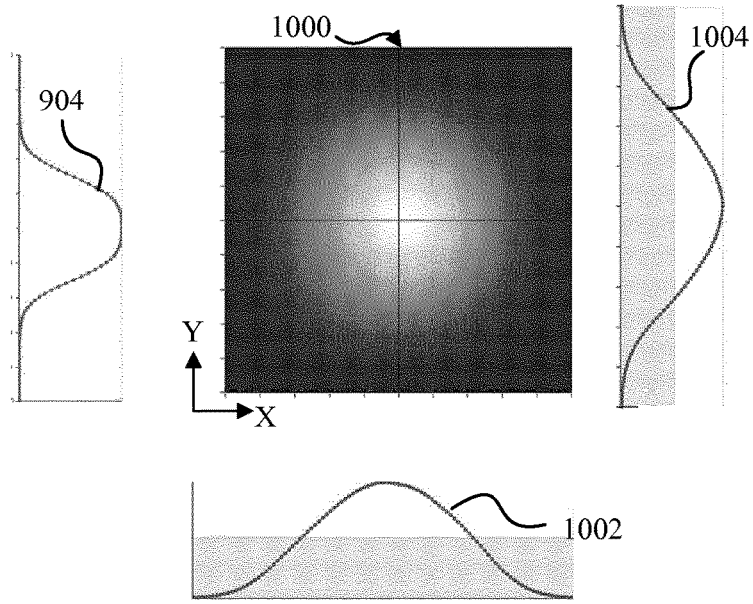
FIG. 9          FIG. 10
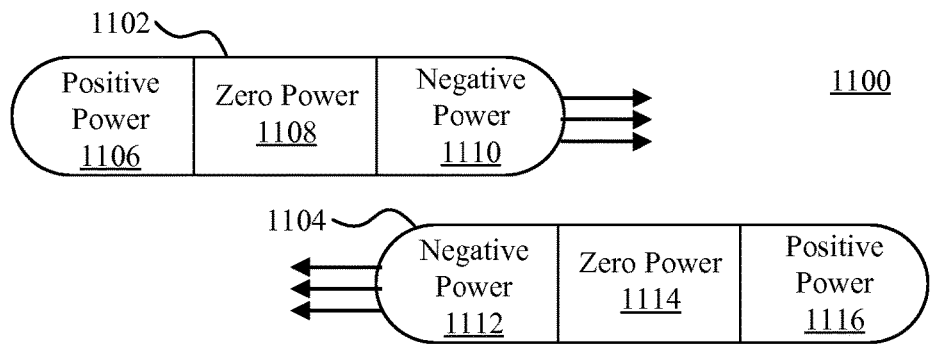
FIG. 11
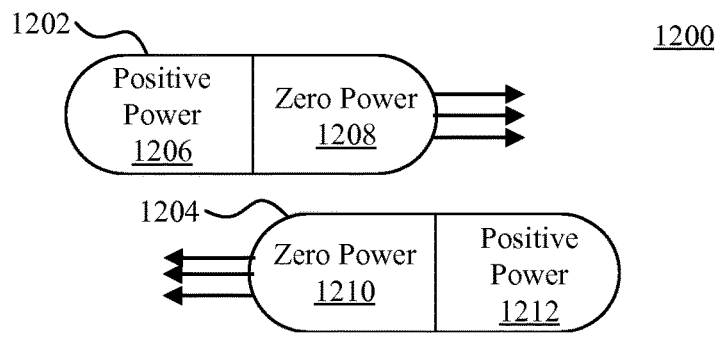
FIG. 12

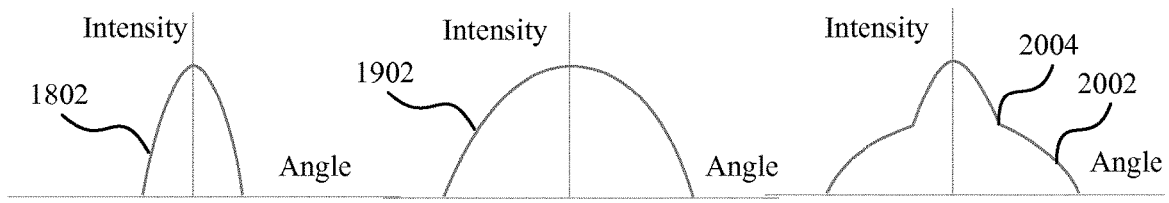
FIG. 18   FIG. 19   FIG. 20
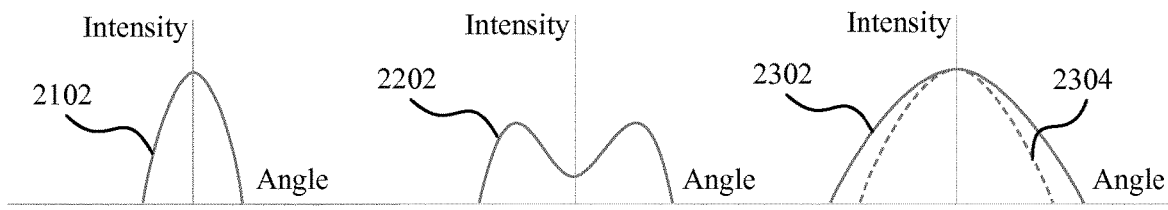
FIG. 21   FIG. 22   FIG. 23
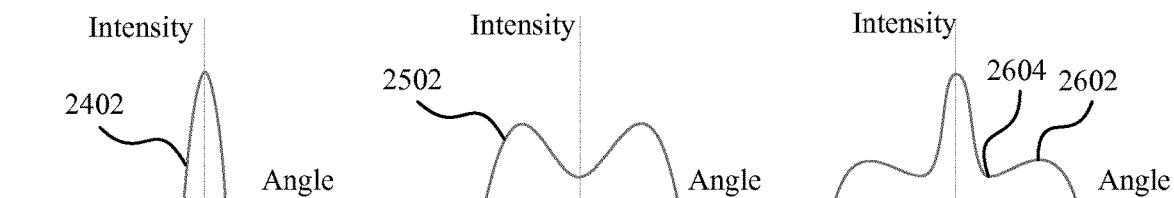
FIG. 24   FIG. 25   FIG. 26
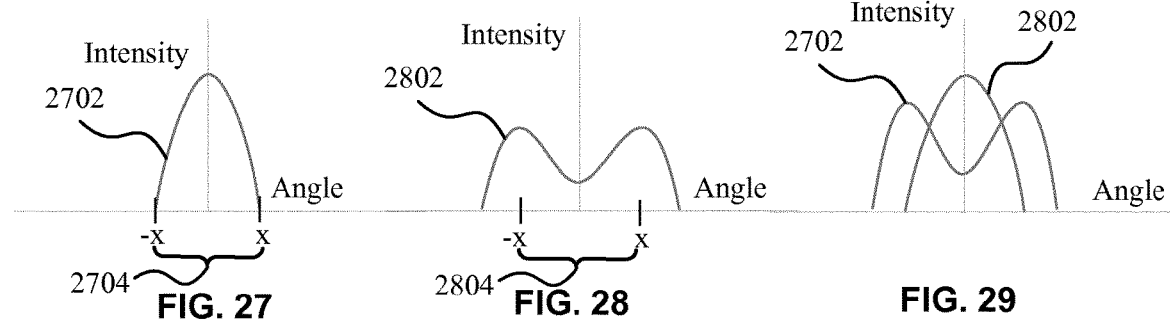
FIG. 27   FIG. 28   FIG. 29
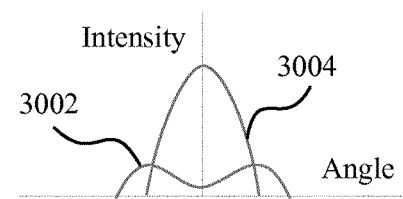
FIG. 30
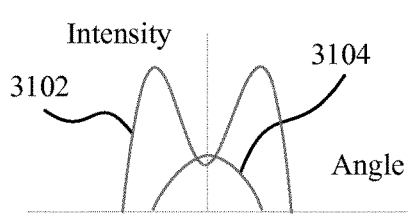
FIG. 31

DEVICES, SYSTEMS AND METHODS FOR VARYING BEAM STRUCTURES

CROSS-REFERENCE TO PRIOR APPLICATIONS

This application is the U.S. National Phase application under 35 U.S.C. § 371 of International Application No. PCT/EP2017/080387, filed on Nov. 24, 2017 which claims the benefit of U.S. Provisional Patent Application No. 62/427,768, filed on Nov. 29, 2016 and European Patent Application No. 16204923.3, filed Dec. 19, 2016. These applications are hereby incorporated by reference herein.

TECHNICAL FIELD

The present invention is directed generally to lighting devices and systems. More particularly, various inventive methods, devices and systems disclosed herein relate to varying beams by employing a lens structure.

BACKGROUND

Digital lighting technologies, i.e. illumination based on semiconductor light sources, such as light-emitting diodes (LEDs), offer a viable alternative to traditional fluorescent, HID, and incandescent lamps. Functional advantages and benefits of LEDs include high energy conversion and optical efficiency, durability, lower operating costs, and many others. Recent advances in LED technology have provided efficient and robust full-spectrum lighting sources that enable a variety of lighting effects in many applications. Some of the fixtures embodying these sources feature a lighting module, including one or more LEDs capable of producing different colors, e.g. red, green, and blue, as well as a processor for independently controlling the output of the LEDs in order to generate a variety of colors and color-changing lighting effects, for example, as discussed in detail in U.S. Pat. Nos. 6,016,038 and 6,211,626, incorporated herein by reference.

LED lighting products commonly provide one of several different beam angles. For example, one particular product line provides one of the following beam angles: 10°, 21°, 36°, 83°. However, a disadvantage is that the beam angles are provided in separate products. Thus, in order to have the option of employing each of the different beam angles, a customer oftentimes is required to purchase each of these products, as none of these products enable a user there to change the beam angle. Although other products enable users to change the beam angle by employing different spread lenses, a disadvantage with these products is that users typically install a different spread lens to obtain a given beam angle. This is especially difficult when the products are installed in hard-to-reach locations.

One solution for varying a beam angle involves moving a light source to different focal positions in a reflector. While the size and shape of the beam does change using this method, the beam is not suitable for architectural or general illumination, as the beam is aesthetically unpleasant. For example, with reference to FIG. 1, a diagram 100 illustrating a narrow focus beam generated with the reflector method is depicted. As shown in FIG. 1, the beam includes a central bright spot 102 inside a wider halo 104 with a surrounding dark region 106. The halo 104 is largely unsuitable for architectural or general illumination purposes. Similarly, FIG. 2 illustrates a diagram 200 of a wide focus beam generated with the reflector method. Here, the beam includes a bright ring 202, a dark center 204, and a wide halo 206 surrounded by a dark area 208. The aesthetic nature of the structure of the beam of FIG. 2 is similarly unsuitable for architectural or general illumination purposes.

SUMMARY

The present disclosure is directed to inventive methods, systems and devices for adjusting a beam structure. Embodiments described herein can be employed to accurately form a wide variety of different beam structures in a simple, compact and elegant manner. For example, embodiments can form and vary a beam structure by implementing a relative sliding of lenses having freeform surfaces designed to shape the light output from a light source at various sliding positions. Light sources providing collimated light are preferred to provide sharp and precise beams. However, although collimated light can be used to form a particular beam structure with a desired beam angle, it is difficult to alter collimated light to form a plurality of different beam structures with different beam angles using the same lens system. The inventor of the present application has found that sliding lenses having freeform surfaces on both the light receiving surface and the light output surface can be employed to provide several different sharp and precise beam structures with collimated light. Alternatively or additionally, to form and vary a beam structure, exemplary embodiments can superimpose light from a system of lighting devices including lenses with at least one freeform surface and a corresponding light source. Here, one of the lighting devices can form a batwing profile that can be superimposed with light from another lighting device. The beam profiles of the lighting devices can be designed so that sliding of their corresponding lenses and superposition of their beams can generate a wide variety of sharp beam structures having a number of different beam angles.

One exemplary aspect of the present application is directed to a lighting device that provides an output beam. The device includes a light source configured to output light and a plurality of lenses. The lenses include a first lens having a first freeform surface configured to receive the light and a second freeform surface configured to transmit the light towards a second lens of the plurality of lenses. The second lens includes a third freeform surface configured to receive the light from the second freeform surface and includes a fourth freeform surface configured to transmit the light out of the second lens.

In accordance with one exemplary embodiment, the light output from the light source and received by the first freeform surface is collimated light. As noted above, it is generally very difficult to produce different accurate beam structures formed from collimated light using the same lenses system. Employing the freeform surfaces, as claimed, can be effective in providing several different sharp and precise beam structures with collimated light.

In an additional embodiment, at least one given freeform surface of the first, second, third and fourth freeform surfaces has the same geometry as at least one other freeform surface of the first, second, third and fourth freeform surfaces except that an edge of the given freeform surface has a steeper geometry than a corresponding edge on the other freeform surface. Alteration of the edge in this way can reduce beam unevenness that may be present at an extreme focal position.

One exemplary embodiment includes a processor configured to receive an indication of a beam structure adjustment and to implement a relative slide between the first and second lenses to adjust a structure of the output beam, where the relative slide is implemented in a lateral direction that is parallel to a plane in which one of the first or second lenses is predominantly disposed. Using a relative slide provides a simple, convenient and effective method to adjust the beam structure accurately. In one version of the embodiment, the processor is configured to implement adjustments of only positive powers. This feature enables the system to be compact while at the same time providing a wide range of beam structures and illumination effects.

Another exemplary aspect is directed to a method for providing a light output beam. In accordance with the method, an indication of a beam structure adjustment is received. In addition, a relative slide between a first lens and a second lens is implemented to adjust a structure of the output beam, where the relative slide is implemented in a lateral direction that is parallel to at least one plane in which at least one of the first or second lenses is predominantly disposed. The first lens includes a first freeform surface configured to receive light from a light source and a second freeform surface configured to transmit the light towards the second lens. In addition, the second lens includes a third freeform surface configured to receive the light from the second freeform surface and a fourth freeform surface configured to transmit the light out of the second lens. Further, the light output beam is generated with the light transmitted out of the second lens.

Another exemplary aspect is directed to a lighting system that provides an output beam. The system includes a plurality of lighting devices including a first lighting device configured to generate a first beam and a second lighting device configured to generate a second beam including a bat-wing profile. In addition, at least one of the first light-emitting device or the second light-emitting device comprises a light source and a plurality of lenses including a first lens having a first freeform surface and a second lens including a second freeform surface. Further, the system is configured to superimpose the first beam and the second beam when the first and second light-emitting devices are activated. Use of the bat-wing profile enables an effective superposition of a plurality of light beams to generate a larger total beam that has a relatively high intensity.

In accordance with one exemplary embodiment, peaks of the batwing profile overlap outer boundaries of the first beam. This overlap enables the system to produce a combined beam that has a substantially uniform brightness.

One exemplary embodiment includes a processor configured to receive an indication of a beam structure adjustment and to implement a relative slide between the first and second lenses to adjust a structure of the output beam, where the relative slide is implemented in a lateral direction that is parallel to at least one plane in which at least one of the first or second lenses is predominantly disposed. As noted above, employing a relative slide provides a simple, convenient and effective method to accurately adjust the beam structure. In one version of the embodiment, the light source is a first light source, and the plurality of lenses is a first plurality of lenses, where the first light emitting device includes the first light source and the first plurality of lenses. In addition, the second lighting device includes a second light source and a second plurality of lenses including a third lens having a third freeform surface and a fourth lens having a fourth freeform surface. Further, the processor is configured to implement the adjustment by sliding at least one of the first, second, third or fourth lenses such that overlap between peaks of the batwing profile and outer boundaries of the first beam is maintained, where the sliding is implemented in the lateral direction. Maintaining the overlap in this way can ensure that the adjustment results in a relatively uniform brightness in the combined beam and/or in a relatively smooth profile of the combined beam. Further, in one version of the embodiment, the processor is configured to alter an intensity of at least one of the first beam or the second beam to implement the adjustment. Altering the intensity can enable the user to adjust the brightness as desired. In addition, exemplary embodiments of the system can adjust the intensity in a way that maintains a smooth beam profile in the mixed light and provides a uniform brightness in the combined beam.

Another exemplary aspect is directed to a method for providing a light output beam. In accordance with the method, an indication of a beam structure adjustment is received. In addition, a relative slide between a first lens and a second lens is implemented to adjust a structure of the output beam, where the relative slide is implemented in a lateral direction that is parallel to at least one plane in which at least one of the first or second lenses is predominantly disposed. Further, a first beam is generated by a first lighting device and a second beam is generated by a second lighting device, where the second beam includes a bat-wing profile. Additionally, at least one of the first light-emitting device or the second light-emitting device includes a light source and a plurality of lenses including the first lens and the second lens, where the first lens includes a first freeform surface and the second lens includes second freeform surface. Here, the generating is performed such that the first beam and the second beam are superimposed.

As used herein for purposes of the present disclosure, the term "freeform surface" should be understood to be distinguished and different from planar surfaces, elliptical surfaces, spherical surfaces, aspherical surfaces having rotational symmetry, and conical surfaces, as a "freeform surface," as term should be understood herein, does not have rotational symmetry. Freeform surfaces in accordance with exemplary embodiments include quadratic-cubic surfaces.

In addition, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radio luminescent sources, and luminescent polymers.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "spectrum" should be understood to refer to any one or more frequencies (or wavelengths) of radiation produced by one or more light sources. Accordingly, the term "spectrum" refers to frequencies (or wavelengths) not only in the visible range, but also frequencies (or wavelengths) in the infrared, ultraviolet, and other areas of the overall electromagnetic spectrum. Also, a given spectrum may have a relatively narrow bandwidth (e.g., a FWHM having essentially few frequency or wavelength components) or a relatively wide bandwidth (several frequency or wavelength components having various relative strengths). It should also be appreciated that a given spectrum may be the result of a mixing of two or more other spectra (e.g., mixing radiation respectively emitted from multiple light sources).

For purposes of this disclosure, the term "color" is used interchangeably with the term "spectrum." However, the term "color" generally is used to refer primarily to a property of radiation that is perceivable by an observer (although this usage is not intended to limit the scope of this term). Accordingly, the terms "different colors" implicitly refer to multiple spectra having different wavelength components and/or bandwidths. It also should be appreciated that the term "color" may be used in connection with both white and non-white light.

The term "color temperature" generally is used herein in connection with white light, although this usage is not intended to limit the scope of this term. Color temperature essentially refers to a particular color content or shade (e.g., reddish, bluish) of white light. The color temperature of a given radiation sample conventionally is characterized according to the temperature in Kelvin (K) of a black body radiator that radiates essentially the same spectrum as the radiation sample in question. Black body radiator color temperatures generally fall within a range of from approximately 700 K (typically considered the first visible to the human eye) to over 10,000 K; white light generally is perceived at color temperatures above 1500-2000 K.

Lower color temperatures generally indicate white light having a more significant red component or a "warmer feel," while higher color temperatures generally indicate white light having a more significant blue component or a "cooler feel." By way of example, fire has a color temperature of approximately 1,800 K, a conventional incandescent bulb has a color temperature of approximately 2848 K, early morning daylight has a color temperature of approximately 3,000 K, and overcast midday skies have a color temperature of approximately 10,000 K. A color image viewed under white light having a color temperature of approximately 3,000 K has a relatively reddish tone, whereas the same color image viewed under white light having a color temperature of approximately 10,000 K has a relatively bluish tone.

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectra of radiation, wherein each different source spectrum may be referred to as a "channel" of the multi-channel lighting unit.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "addressable" is used herein to refer to a device (e.g., a light source in general, a lighting unit or fixture, a controller or processor associated with one or more light sources or lighting units, other non-lighting related devices, etc.) that is configured to receive information (e.g., data) intended for multiple devices, including itself, and to selectively respond to particular information intended for it. The term "addressable" often is used in connection with a networked environment (or a "network," discussed further below), in which multiple devices are coupled together via some communications medium or media.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

The term "user interface" as used herein refers to an interface between a human user or operator and one or more devices that enables communication between the user and the device(s). Examples of user interfaces that may be employed in various implementations of the present disclosure include, but are not limited to, switches, potentiometers, buttons, dials, sliders, a mouse, keyboard, keypad, various types of game controllers (e.g., joysticks), track balls, display screens, various types of graphical user interfaces (GUIs), touch screens, microphones and other types of sensors that may receive some form of human-generated stimulus and generate a signal in response thereto.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIGS. 5A-5C are graphs illustrating spot intensities of exemplary beam structures that can be formed by the device of FIG. 4 in accordance with exemplary embodiments.

FIG. 9 is a diagram illustrating the intensity distribution of a spot formed by a lighting device employing a lens having a flat first side and a curved second, opposing side.

FIG. 10 is a diagram illustrating the intensity distribution of a spot formed by a lighting device employing a lens having curved surfaces on opposing sides of the lens.

FIG. 11 is a diagram illustrating a sliding lens structure having both positive and negative powers.

FIG. 12 is a diagram illustrating a sliding lens structure without negative powers.

FIGS. 18-31 are graphs illustrating intensity distributions of various beams and superimposed beams.

DETAILED DESCRIPTION

Exemplary embodiments described herein provide inventive methods, systems and devices for adjusting a light beam for purposes of forming a number of different beam structures having different beam angles. Here, embodiments can generate and alter a beam structure by employing sliding lenses with freeform surfaces configured to form desired beam angles at various sliding positions. As noted above, collimated light from a light source is preferable, as it can provide sharp and precise beams. However, it is difficult to form a plurality of different and accurate beam structures from collimated light using the same lens system. The inventor of the present application has recognized and appreciated that employing a sliding lens system with freeform surfaces at both the light receiving surface and the light output surface of the lenses can enable the formation of different beams with sharp and precise beam structures. Alternatively or additionally, a plurality of different sharp and precise beam structures can be formed by superimposing light from a system of lighting devices including lenses with at least one freeform surface and a corresponding light source. For example, exemplary embodiments can employ a lighting device forming batwing profile and can superimpose the batwing profile with light from another lighting device. Here, the beam profiles can be configured so that sliding of their corresponding lenses and superposition of their beams can generate different beam structures having a variety of different and accurate beam angles.

In addition to sharp beam structures, exemplary embodiments employing the freeform surface structures described herein and/or the superposition of profiles formed by freeform surface structures described herein can provide, for example, between at least 80-100 diopters of light bending, which is significantly larger than freeform lenses employed for ophthalmic applications, which in turn provide approximately 3 diopters of light-bending power. Furthermore, in further contrast to ophthalmic applications, these exemplary embodiments can also provide one or more of a wide variety of elliptical beams including, for example, 10×60 degrees or 15×30 degrees. Moreover, by employing the principles described herein, the exemplary embodiments can vary between a round beam pattern, such as, for example, a 30×30 degree beam structure, to an elliptical pattern, such as, for example, a 15×30 degree pattern, something that is not useful in ophthalmic applications. In addition, exemplary embodiments can be configured to change between two opposing elliptical orientations, for example between a 20×50 degree beam structure to a 50×20 degree beam structure.

Figure 1:
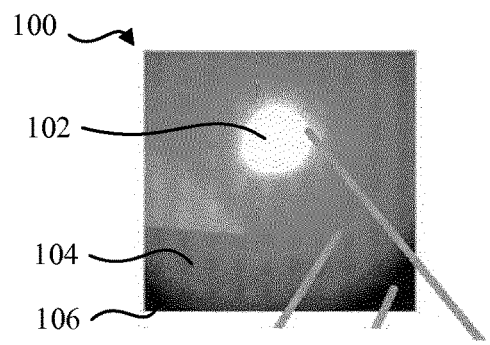
FIG. 1 is a diagram illustrating a prior art narrow beam structure.
Figure 2:
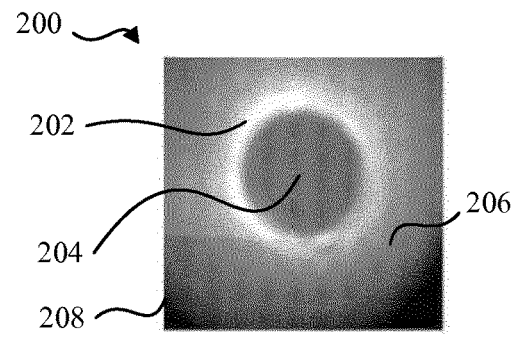
FIG. 2 is a diagram illustrating a prior art wide beam structure.
Figure 3A:
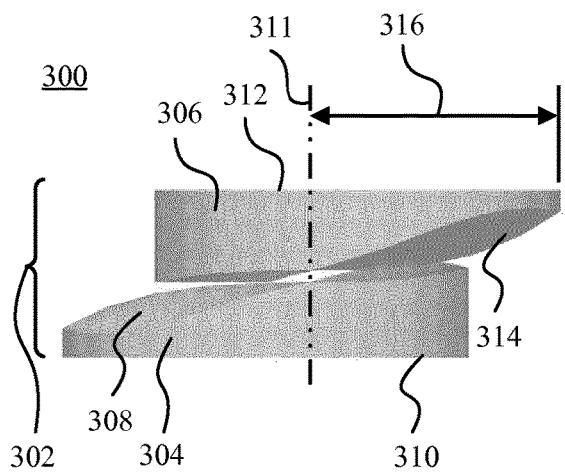
FIGS. 3A-3C are diagrams illustrating a freeform lens structure in various sliding positions in accordance with exemplary embodiments.
Figure 3B:
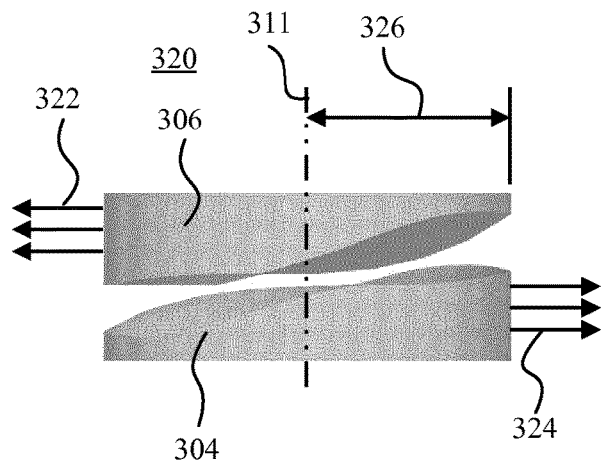
Figure 3C:
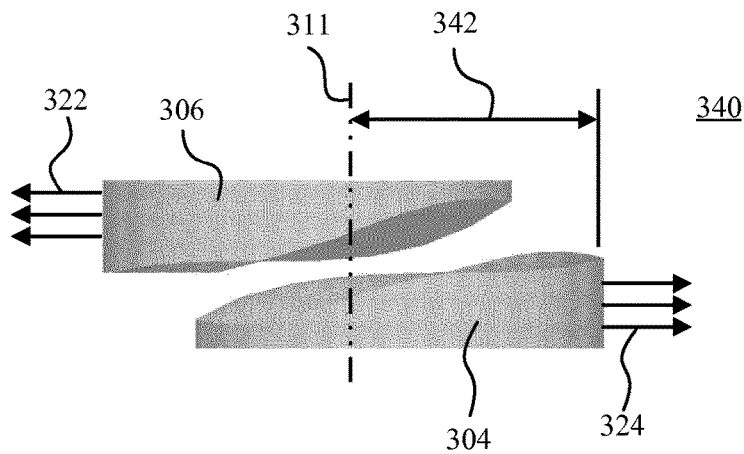

Referring to FIGS. 3A-C, a sliding lens structure 302 that can be employed in exemplary embodiments is illustratively depicted. The lens structure 302 includes two individual lenses 304 and 306 having respective freeform surfaces 314 and 308 and respective planar surfaces 312 and 310. In accordance with embodiments described in more detail herein below, it is preferable to employ lenses having two freeform surfaces each, as opposed to having a planar surface, such as surfaces 310 and 312, for purposes of forming, from collimated light, beam structures with focused light. However, the lens structure 302 can be suitable for use in a system of lighting devices that superimposes light from the various devices, as discussed in detail herein below with respect to FIG. 17.

The lens structure 302 is configured such that implementing a relative linear shift or slide between the lenses in one direction, to the left or the right in FIG. 3A, spreads the light in two directions. A linear shift or slide in the lenses produces a radially symmetric change in the beam angle in accordance with one embodiment. Configuration 300 in FIG. 3A denotes the null position, where the lenses do not spread the beam. In one embodiment, the distance 316 between the edge of lens 306 and the centerline 311 at the null position is 17.5 mm. In addition, the distance between the planar edges 312 and 310 in this embodiment is 15 mm. In accordance with one exemplary aspect, the lenses 306 and 304 can be shifted in opposing directions 322 and 324, as illustrated in FIG. 3B. In particular, as shown in FIG. 3B, one or both of the lenses 306 and 304 can be shifted in the lateral direction, i.e. in a direction that is parallel to the plane(s) in which one or both of the lenses 306 and 304 is/are predominantly disposed. In accordance with one exemplary embodiment, the shift or slide can be moved only in the lateral direction, where a constant distance between the lenses in the vertical direction of FIG. 3B during the shift can be maintained. However, preferably, movement of the lenses 306 and 304 toward or away from each other during the shift or slide can be implemented for purposes of ensuring that the lenses 306 and 304 are as close together as possible at all times. In either case, the lenses should not be rotated. The movement of the lenses 306 and 304 closer or away from each other should be performed to the extent that mechanical interference is not created between the lenses. Maintaining the smallest possible gap between the lenses, including at the various positions of lateral shift, improves lens performance in general. In particular, minimizing the gap can reduce any inaccuracies in the focused light due to the fact that the surfaces of the lenses are not rotationally symmetric. The size of the gap between the lenses of the lens system depends on mechanical tolerances, but a typical gap could be, for example, 0.5 mm. It should be noted that the distance between the lenses has a negligible effect on the focusing power. The change in focusing power is due to the lateral shift, rather than from the separation distance of the lenses.

It should be noted that, in traditional optical zoom lenses, the focusing power stems from the distance between lenses or groups of lenses, and lateral movement is to be avoided because it would cause optical aberrations. In accordance with exemplary embodiments of the present application, the distance between the lenses is constant or minimized and the focusing power is achieved from the lateral movement, as noted above.

In configuration 320 of FIG. 3B, lens 306 is shifted in direction 322 by 3.25 mm, while lens 304 is similarly shifted in direction 324 by 3.25 mm so that the distance 326 between the edge of lens 306 and the centerline 311 is 14.25 mm. In turn, FIG. 3C illustrates the configuration 340 providing the widest beam spread in this embodiment, where the lens 306 is shifted in direction 322 by 6.5 mm from the null position and lens 304 is shifted in direction 324 by 6.5 mm from the null position so that the distance 342 between the edge of lens 304 and the centerline 311 is 17.5 mm. When the lens structure 300 is implemented in lighting device 400, described in detail herein below with respect to FIG. 4, the shift resulting in the configuration 340 of FIG. 3C provides 39 diopters of bending power. Preferably, the distances 316 and 342 are equal to each other from the centerline and can range, for example, from 2 mm to 100 cm or more. Performance, in terms of accurate bending or focusing of the light, can be improved when the maximum amount of lateral shift is longest compared to the size of the lenses. For example, a typical lens system for a single collimated LED source of 2 cm diameter should have lenses that are each at least 2 centimeters wide to capture all of the collimated light and can each have a length of between 4-8 centimeters long (in the lateral direction) with a maximum lateral shift of 1-3 cm. Preferably, the slide distance is as long as is practically and mechanically possible. Similarly, if the collimated light source is 10 cm in diameter, the lenses should each be at least 10 cm wide to capture all of the collimated light and can each be 40-80 cm long (in the lateral direction) with a maximum shift of 10-30 cm in the lateral direction. Thus, in accordance with exemplary embodiments described herein, the ratio (ML/G) of the maximum lateral (ML) shift in the lateral direction to the gap (G) between the lenses can be at least 20 and/or can range from, for example, 20 to 600. However, it should be understood that the lenses can have any size and this ratio can vary with the size of the lenses and their configuration. It should be noted that, with respect to the particular example illustrated in FIG. 3C, if movement of the lenses 306 and 304 in the vertical direction, i.e. toward or away from each other, is implemented, the lenses can be moved closer together by approximately 1-2 mm closer if the lateral shift is 10 mm.

Figure 4:
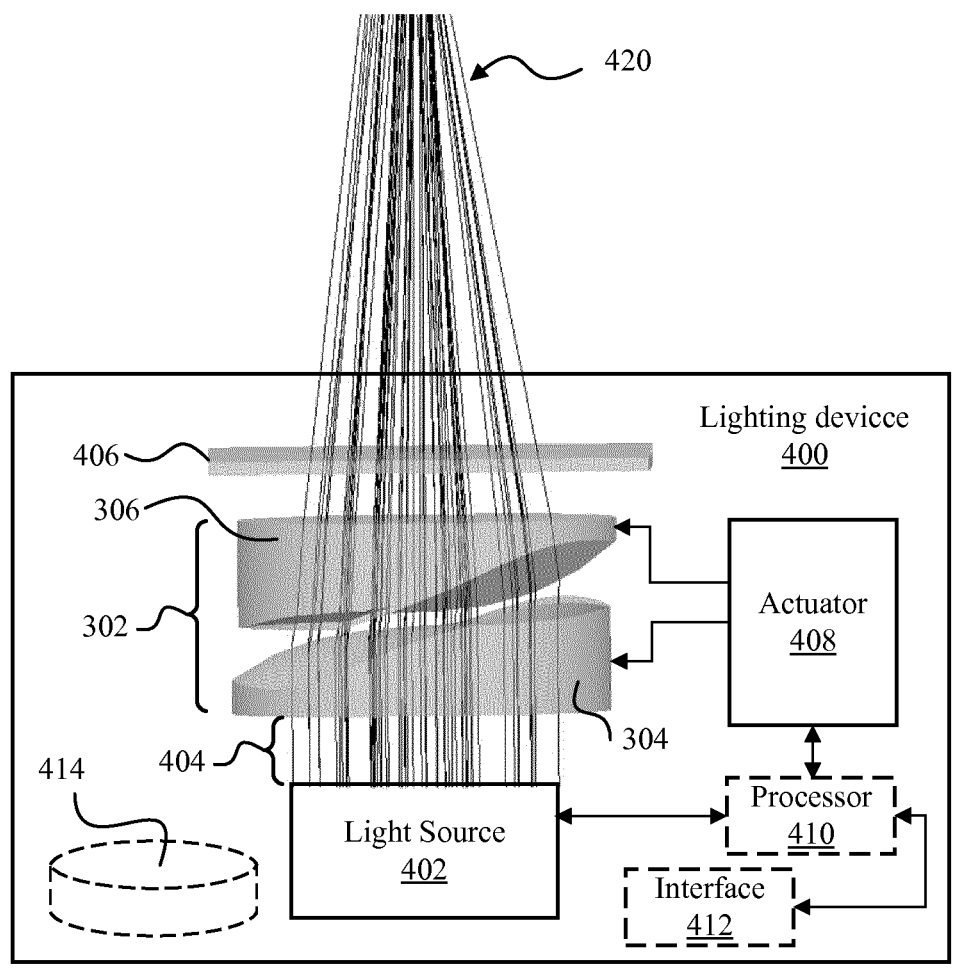
FIG. 4 is a high-level block diagram illustrating a lighting device employing a sliding freeform lens structure to adjust a beam structure in accordance with exemplary embodiments.

With reference now to FIG. 4, a lighting device 400 in accordance with an exemplary embodiment is illustratively depicted. The device 400 can include a light source 402, the lens structure 302, a diffuser 406, an actuator 408, a processor 410, a memory or storage device 414 and an interface 412. The light source 402 is preferably configured to output collimated light 404. In accordance with one exemplary embodiment, the light source 402 can be composed of at least one LED and a total internal reflection optic that is configured to provide collimated light 404. Preferably, a total internal reflection optic is employed with one or more LEDs. However, it should be noted that one or more LEDs with a Fresnel lens or one or more LEDs with a reflector can be employed in other embodiments. It should be further understood that the light source 402 can be implemented with other types of light sources, as noted above, and can be configured to provide collimated light in accordance with any devices or methods employed in the technical field. In addition, the light source 402 can be configured to alter the color and/or color temperature of the output beam. As illustrated in FIG. 4, the light source 402 can be configured to provide the collimated light 404 to the lens 304, which transmits the light to the lens 306, which in turn outputs the light to the diffuser 406, which can be, for example, a 10-degree diffuser that diffuses light transmitted out of the lens 306. Here, an air gap can separate the diffuser 406 from the lens 306. Further, the actuator 408 can be any mechanical actuator that is coupled to one or both of the lenses 306 and 304 and implements a sliding movement, as described for example with respect to FIGS. 3A-C, by sliding one or both of the lenses 306 and 304. The light 420 exiting the device 400 can be altered and controlled to implement a plurality of different beam structures and beam angles. In accordance with one exemplary embodiment, the processor 410 can control the actuator 408 and/or the light source 402 based on instructions received through the interface 412 or stored in memory 414. The interface 412 can be an interface connected to another computing device or processor directly or through a network, or can be a user-interface. For example, the user-interface can be a touch-screen, a keyboard, a touch pad, or one or more of any suitable variety of user-interfaces. According to one exemplary aspect, as user may enter or select an indication of a desired beam structure or angle. In turn, the memory 414 can include data describing the relationship between beam structures and beam angles to corresponding relative shifts between lenses 304 and 306. In addition, the processor can control the actuator 408 to implement a relative slide or shift between the lenses to form the selected beam structure in output light 420, as discussed in more detail herein below with respect to methods 3200 and 3300 of FIGS. 32 and 33, respectively. Here, the actuator 408 can implement a lateral shift between the lenses, as discussed above with respect to FIG. 3B.

In accordance with one exemplary embodiment, the device 400 can be configured to generate beams 420 having at least beam angles between 12 degrees and 37 degrees, where larger beam angles are formed by increasing the shift between the lenses of the lens structure 302. However, other beam angles can be formed by appropriately modifying the configuration of the freeform surfaces of the lenses 304 and 306, which is discussed in more detail herein below. FIGS. 5A-5C illustrate spots of exemplary beam structures that can be formed by the system 400. For example, FIG. 5A illustrates a diagram 500 of a spot having a 12 degree beam angle, where plot 504 shows the light intensity of the spot in the y-direction and plot 502 shows the intensity of the spot in the x-direction. In addition, FIG. 5B depicts a diagram 510 of a spot having an 18 degree beam angle, where plot 514 shows the light intensity of the spot in the y-direction and plot 512 shows the intensity of the spot in the x-direction. Further, FIG. 5C illustrates a diagram 520 of a spot having a 37 degree beam angle, where plot 524 shows the light intensity of the spot in the y-direction and plot 522 shows the intensity of the spot in the x-direction.

As noted above, the term "freeform surface" should be understood to be distinguished and different from planar surfaces, elliptical surfaces, spherical surfaces, aspherical surfaces having rotational symmetry, and conical surfaces, as a "freeform surface," as term should be understood herein, does not have rotational symmetry. Freeform surfaces in accordance with exemplary embodiments include quadratic-cubic surfaces. To form an adequate freeform surface for purposes of generating a variety of beam structures having different beam angles, in accordance with one exemplary aspect, a positive lens can be modeled as two crossed cylinders. The freeform surfaces 308 and 314 of lenses 304 and 306 can be modeled in the same way and can be identical but oppositely oriented, as illustrated in FIG. 3B. Here, each one of the freeform surfaces 308 and 314 can be modeled as follows:

$$Z_{FirstLens} = A\left(\frac{1}{3}(x - \Delta_{max})^3\right) - Axy^2 + Dx \quad (1)$$

$$Z_{SecondLens} = A\left(\frac{1}{3}(x + \Delta_{max})^3\right) - Axy^2 + Dx, \quad (2)$$

where (1) and (2) can be expressed as $$Z_{FirstLens} = \frac{A}{3}(x^3 - 3x^2\Delta_{max} + 3x\Delta_{max}^2 - \Delta_{max}^3) - Axy^2 + Dx \quad (3)$$

$$Z_{SecondLens} = \frac{A}{3}(x^3 + 3x^2\Delta_{max} + 3x\Delta_{max}^2 + \Delta_{max}^3) - Axy^2 + Dx \quad (4)$$

where $Z_{FirstLens}$ denotes the first lens (e.g., lens 304), $Z_{SecondLens}$ denotes the second lens (e.g., lens 306), x denotes the direction of the slide or shift (e.g., directions 322/324), z denotes the height of the surface in FIGS. 3A-C and is perpendicular to the x direction and the y direction, y denotes a direction that is in the plane of the lens and is perpendicular to both x and z, A and D denote weighting biases that can be selected and varied in accordance with design choice, and $\Delta_{max}$ denotes the maximum displacement or slide in the x direction. It should be noted that adding in a bias can configure one cylinder to have full optical power at position or shift $\Delta=0$ and zero optical power at $\Delta=\Delta_{max}$. Adding a bias in this way has the effect of creating a vertical beam when the lenses are in one extreme position and a horizontal beam when the lenses are in the opposite extreme position for a system that would otherwise produce a beam of rotational symmetry.

Figure 6:
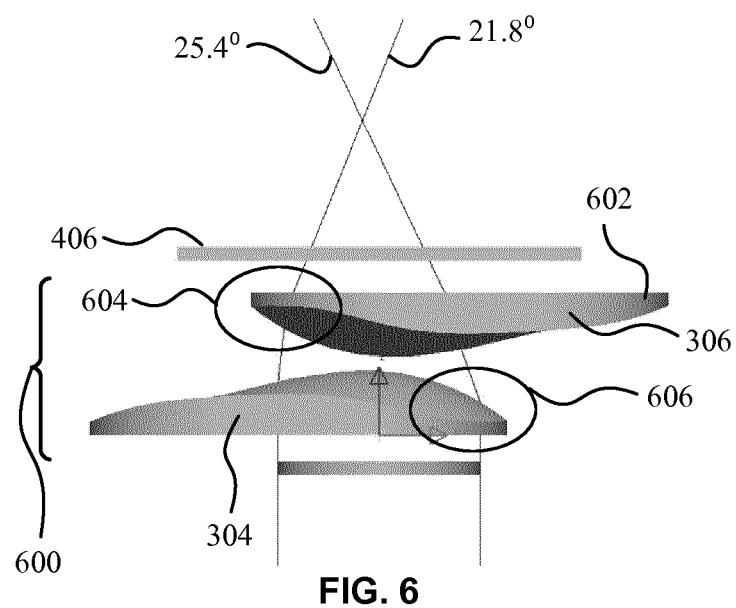
FIG. 6 is a diagram illustrating a freeform lens structure including a steeper edge that can aid in correcting uneven refraction in accordance with exemplary embodiments.

In accordance with one exemplary aspect, the freeform surfaces 308 and 314 can be configured to have slightly different geometry rather than identical geometry. For example, if freeform surfaces with identical geometries are employed, there may be instances in which an asymmetry is present in a beam structure, or in the spot of a beam. Here, the asymmetry is worsened with increasing beam angle of the beam structure. With reference to FIG. 6, the asymmetry can stem from uneven light refraction at regions 604 and 606 of lenses 306 and 304, respectively. For example, in the illustrative embodiment of the lenses depicted in FIG. 6, the region 604 refracts light such that it is output from the device 400 at 21.8 degrees, while the region 606 refracts light such that it is output from the device at 25.4 degrees. In this example, the unevenness of light refraction is most severe at the extreme focal position. Thus, according to one exemplary aspect, the edge of freeform surface 314 of lens 306 can be altered without adversely affecting the beam in other positions. In particular, the freeform surface in region 604 can be made slightly steeper than the freeform surface in region 606, which need not be modified. This increase in surface steepness compensates for the uneven refraction.

Figure 7:
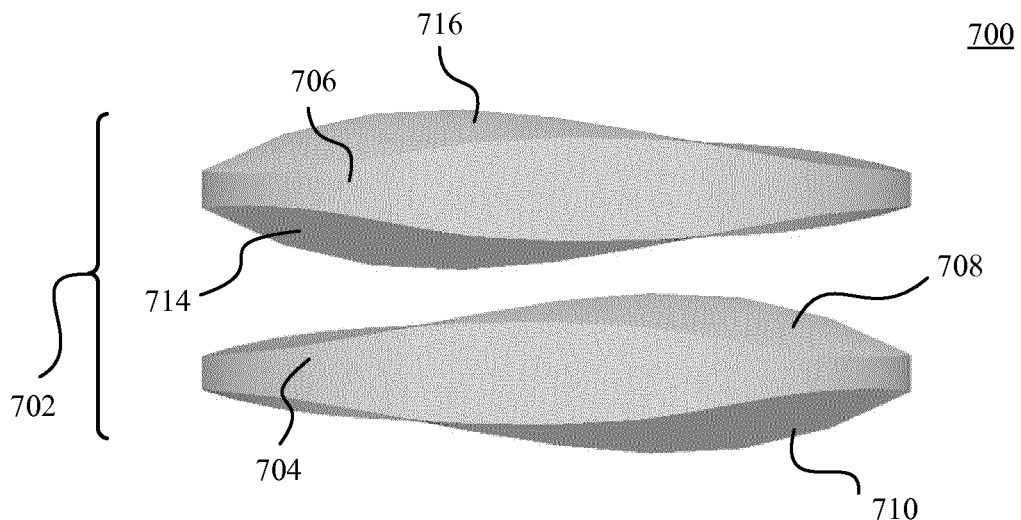
FIG. 7 is a diagram illustrating a lens structure in which lenses respectively include freeform surfaces on both sides thereof in accordance with exemplary embodiments.

As discussed above, preferably, the sliding lenses have freeform surfaces on both the light receiving surface and the light output surface to provide several different beam structures with collimated light having enhanced sharpness and accuracy. For example, as illustrated in FIG. 7, a lens structure 702 can include a lens 704 having a light receiving freeform surface 710 and a light output freeform surface 708. In addition, the lens structure 702 can further include a lens 706 having a light receiving freeform surface 714 and a light output freeform surface 716. Here, the freeform surface 708, denoted as $Z_{TopFirst}$, of lens 704 can be configured as follows:

$$Z_{TopFirst} \equiv \frac{Z_{FirstLens}}{2} \quad (5)$$

where $Z_{FirstLens}$ is defined in equations (1) or (3). In addition, the freeform surface 710, denoted as $Z_{BottomFirst}$, of the lens 704 can be configured as follows:

$$Z_{BottomFirst} = -Z_{TopFirst} \quad (6)$$

Further, the freeform surface 716 of lens 706 can be configured as follows:

$$Z_{TopSecond} \equiv \frac{Z_{SecondLens}}{2} \quad (7)$$

where $Z_{SecondLens}$ is defined in equations (2) or (4). Moreover, the freeform surface 714, denoted as $Z_{BottomSecond}$ can be configured as follows:

$$Z_{BottomSecond} = -Z_{TopSecond} \quad (8)$$

It should be understood that these freeform surface configurations are exemplary and that other configurations can be employed in accordance with exemplary embodiments. Similar to the lens structure 302, the freeform surface 714 can have an identical geometry as 708, and conversely, the freeform surfaces 710 and 716 can be configured in accordance with equations (5)-(8). In alternative embodiments, the edge of freeform surface 714 (and/or surface 716) can be altered to have a slightly steeper geometry than a corresponding edge of freeform surface 708 (and/or surface 710) as discussed above with respect to FIG. 6.

Figure 8:
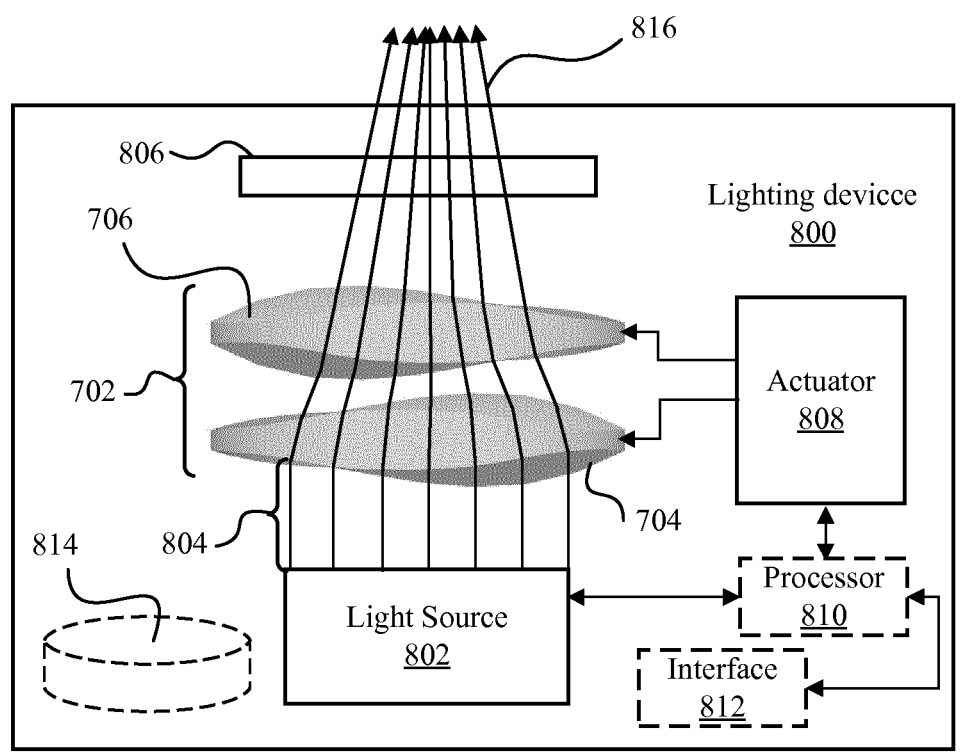
FIG. 8 is a high-level block diagram illustrating a lighting device employing the sliding freeform lens structure of FIG. 7 to adjust a beam structure in accordance with exemplary embodiments.

As shown in FIG. 8, the lens structure 702 can be implemented in a lighting device 800 in accordance with one exemplary embodiment. Here, the lighting device 800 can include a light source 802, which can be configured to output collimated light 804, the lens structure 702, a diffuser 806, an actuator 808, a processor 810, a memory or storage device 814 and an interface 812. The light source 802, the diffuser 806, the actuator 808, the processor 810, the memory or storage device 814 and the interface 812 can be the same as the light source 402, the diffuser 406, the actuator 408, the processor 410, the memory or storage device 414 and the interface 412, respectively, except that the air gap between the diffuser 806 and the lens structure 702, the distance between the lenses 706 and 702, and the distance between the lens structure 702 and the light source 802 can be modified appropriately to suit the dual freeform surfaces of lenses 706 and 704, and except that the processor 810, memory 814 and actuator 808 are appropriately modified to match slide or shift distances to corresponding beam angles or beam structures producible by the lens structure 702. Thus, the freeform surface 710 of lens 704 can receive collimated light 804, the freeform surface 708 of lens 704 can receive light from the surface 710 through the lens 704 and can transmit the light to the freeform surface 714 of lens 706. The freeform surface 716 can receive the light from the freeform surface 714 through the body of the lens 706 and can output light to the diffuser 806 to form beam 816. It should be noted that diffusers 406 and 806 are optional and need not be included in devices 400 and 800. However, the diffusers are beneficial in that the can provide a more uniform beam, as they can smooth out the beam structure, including the edges of the beam, for aesthetic appeal. In addition, optical elements other than diffusers 406, such as other lenses, for example, can be added to or used in lieu of diffusers 406 and 806 in other exemplary embodiments. As noted above, the diffusers preferably are disposed above the lenses, as the lenses provide better results when they are illuminated with collimated light.

The use of freeform surfaces on two sides of a given lens, as for example, shown in FIG. 7 with respect to lens 704 and to lens 706, in a lighting device or illumination system, as opposed to employing one freeform surface, provides several advantages. These advantages are present when utilizing any light source, but are especially apparent with light sources that provide collimated light. For example, the use of two opposing freeform surfaces counteracts uneven refraction on the left and right edges of the lens and results in a more even and symmetric beam. In addition, employing lenses with two freeform surfaces also increases the maximum beam angle (i.e., optical power) and efficiency of the lens. These benefits are especially perceptible when lenses of greater than 40 diopters are utilized in an illumination device or system. FIGS. 9 and 10 illustrate the advantages of implementing freeform surfaces on opposing sides of a lens. In particular, FIG. 9 depicts a diagram 900 showing a spot on a wall one meter away from a lighting device employing a lens having a flat first side and a curved second, opposing side. Plot 902 illustrates the intensity in the x-direction, while plot 904 illustrates the intensity in the y-direction. As shown in plot 902, a slight asymmetry is present at a beam angle of 42 degrees. In contrast, FIG. 10 shows a diagram 1000 illustrating a spot on a wall one meter away from a lighting device employing a lens having curved surfaces on opposing sides of the lens. Plot 1002 denotes the intensity in the x-direction, while plot 1004 denotes the intensity in the y-direction. As illustrated in plot 1002, there are no asymmetry problems, even at a greater beam angle of 60 degrees, as shown in the diagram 1000.

Figure 13:
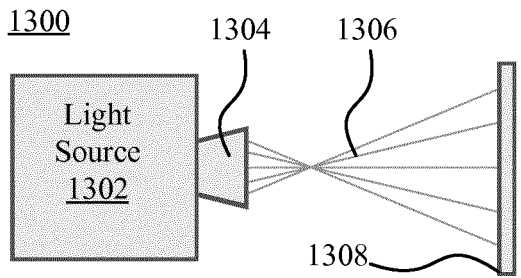
FIG. 13 is a high-level block diagram illustrating a lighting system that produces a converging beam.
Figure 14:
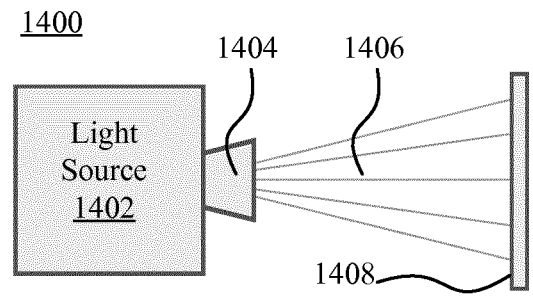
FIG. 14 is a high-level block diagram illustrating a lighting system that produces a diverging beam.

It should be noted that variations of the above-referenced lens structures can be implemented to achieve a simpler and more compact lighting device. For example, in accordance with exemplary embodiments, the lenses of the lens structure can be configured to shift in only one direction. With reference to FIGS. 11 and 12, the lens structure can be configured to shift or slide in the lateral direction, as discussed above with respect to FIG. 3B. FIG. 11 illustrates an exemplary lens structure 1100 in which the lenses are designed to shift in two directions, where a lens 1102 of lens structure 1100 includes a positive power portion 1106, a zero power portion 1108 and a negative power portion 1110, and a lens 1104 of lens structure 1100 includes a negative power portion 1112, a zero power portion 1114 and a positive power portion 1116. Here, the lens structure 1100 has no optical power in the null position, has positive power when translated from the null position in one direction and has negative power when translated from the null position in the opposite direction. In addition, the lenses 1102 and 1104 also have constant wedge throughout. This wedge cancels out because each lens is oriented and translated in an opposite direction. The configuration in FIG. 11 illustrates a negative power position. However, as illustrated in FIG. 11, the lens structure 1100 is relatively large and would require a relatively large amount of space in a lighting device. In accordance with one exemplary aspect, the lens structure omits the negative portion of the lenses, as shown in FIG. 12. Here, the lens 1202 of lens structure 1200 has only a positive power portion 1206 and a zero power portion 1208, while the lens 1204 of lens structure 1200 has only a zero power portion 1210 and a positive power portion 1212. As such, the lens structure 1200 is configured to shift from the null position only in one direction, which results in a much smaller lens structure, while at the same time maintaining beam shifting performance, as is useful in illumination systems. For example, in imaging optical applications, it is important to control whether a beam is diverging or converging. FIG. 13 illustrates a lighting device 1300 including a light source 1302 and optics 1304 that produce a converging light beam 1306 to illuminate a target 1308. In turn, FIG. 14 illustrates a lighting device 1400 including a light source 1402 and optics 1404 that produce a diverging light beam 1406 to illuminate a target 1408. For illumination applications, the distinction between converging and diverging beams are often unimportant, as, at a distance, converging and diverging beams of similar angles produce the same illumination patterns on a surface, as indicated by FIGS. 13 and 14.

Figure 15:
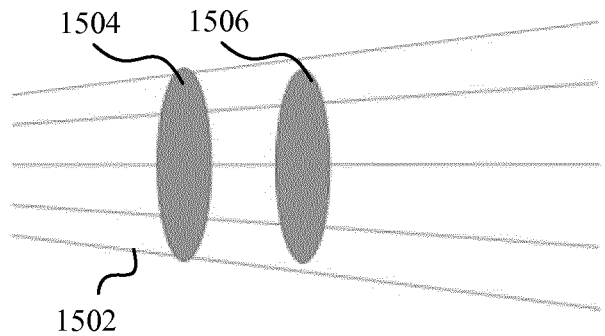
FIG. 15 is a high-level diagram illustrating the behavior of diverging light rays with a lens structure.
Figure 16:
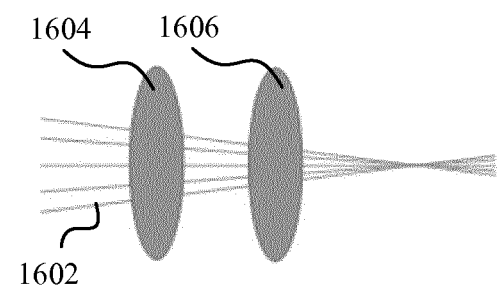
FIG. 16 is a high-level diagram illustrating the behavior of converging light rays with a lens structure.

Although compactness can be achieved by employing only negative and zero powers in lens structures in accordance with exemplary embodiments, it is preferable to employ the lens structure 1200 of FIG. 12. For example, with reference to FIGS. 15 and 16, a converging beam 1602 is preferable to a diverging beam 1502 because the beam grows smaller as it passes through each lens, as illustrated in FIG. 16. Thus, lenses 1604 and 1606 that are configured in accordance with lens structure 1200 can be only as large as the light source and are less likely to produce stray light, as both lenses capture the light. In contrast, when a diverging beam 1502 is employed and formed with lenses 1504 and 1506 having only negative and zero powers, at least one of the lenses, e.g., lens 1506, does not capture some of the light. As such, converging beams with only positive and zero powers are preferable.

Figure 32:
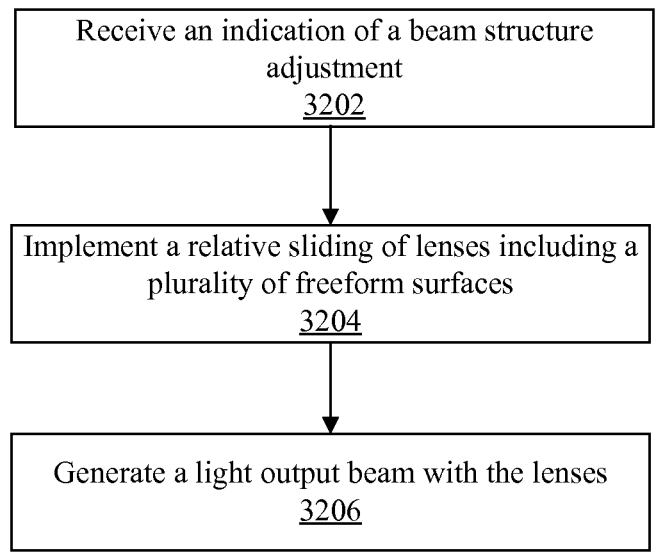
FIG. 32 is a high-level flow diagram of a method for providing a light output beam in accordance with exemplary embodiments.

Referring now to FIG. 32, an exemplary method 3200 for providing a light output beam in accordance with exemplary embodiments is illustratively depicted. It should be noted that the method 3200 can be performed by the system 400 described above and/or by the system 800 described above. In addition, it should be further noted that the features of the lens structure 600 and/or the features of the lens structures 1100 or 1200 can be employed in the lens structure 302 of the system 400 and/or the lens structure 702 of the system 800. Furthermore, the method 3200 can be implemented as, at least in part, instructions of a computer program stored on the storage medium 414/814. The method 3200 can begin at step 3202, at which the processor 410/810 can receive an indication of a beam structure adjustment through the interface 412/812. Here, the interface can be a user-interface such as, for example, a touch screen, a keyboard, a mouse, a keypad, a remote control interface that can communicate wirelessly to a remote control or any other appropriate user-interface through which a user may provide the system 400/800 with an indication of a beam structure adjustment. Alternatively or additionally, the interface 412/812 may be an interface that is coupled to another computing device. For example, the interface 412/812 may be a hardware port coupled directly to another computing device or coupled to a network to which the other computing device is coupled. Alternatively, the interface 412/812 can be a wireless interface coupled directly to another computing device or coupled to a network to which the other computing device is coupled. The network in both cases can be a wired network, a wireless network or a combination of a wired and wireless network, and can further comprise the internet and/or a cloud system, of which the other computing device can be a part, in each of these cases. Here, the other computing device can remotely control the lighting device 400/500 and can provide the indication of the beam structure adjustment as part of a program stored at the computing device or elsewhere in the network or cloud, or can provide the indication of the beam structure adjustment by relaying an input provided by a user.

The beam structure adjustment can be an adjustment of the size, angle, color, color temperature, intensity and/or configuration (e.g., shape) of the beam. In addition, sizes, angles and/or configurations of the beam can be correlated to respective relative slide positions between the lenses 304 and 306 in the memory 414 and/or sizes, angles and/or configurations of the beam can be correlated to respective relative slide positions between the lenses 704 and 706 in the memory 814. For example, the memory 414/814 can include a table relating relative slide positions to sizes, angles and/or configurations such that the processor 410/810 can receive a particular size, angle and/or configuration and can determine the appropriate relative slide position to implement the received size, angle and/or configuration of the beam by correlating the received size, angle and/or configuration to the appropriate relative slide position in the table. Here, if the received size, angle and/or configuration is not precisely defined in the table, the processor 410/810 can be configured to select the relative slide position correlated to the size, angle and/or configuration that is most similar to the received size, angle and/or configuration. Alternatively or additionally, the relationship between sizes, angles and/or configurations and relative slide positions can be defined as a function. Furthermore, in addition to or as an alternative to a size, angle and/or configuration, the indication of the beam adjustment can be an indication of the relative slide position or an indication of the lens slide adjustment itself. Moreover, the indication can be a code denoting a size, angle, color, color temperature, intensity and/or configuration (e.g., shape) of the beam, a relative slide position that will implement a desired size, angle and/or configuration and/or the lens slide adjustment that would lead to a relative slide position that will implement a desired size, angle and/or configuration. Alternatively or additionally, the indication of a beam structure adjustment received at step 3202 can be a program including a set of sizes, angles, colors, color temperatures, intensity and/or configurations that change over time, relative slide positions of the lenses 306 and 304 or relative slide positions between lenses 706 and 704 that change over time, and/or lens slide adjustments that are implemented at different times according to the program. Additionally, it should also be noted that the indication of the beam structure adjustment can define an initial beam structure or can define an adjustment to an existing light beam.

At step 3204, the processor 410/810 can control the actuator 408/808 to implement a relative sliding of lenses 306 and 304 or of lenses 706 and 704 to perform the beam structure adjustment(s) received at step 3202 and thereby adjust the structure of the output beam 420/820. As stated above, the actuator 408/808 can implement the relative slide or shift of the lenses 306 and 304 and/or of lenses 706 and 704 in the lateral direction, as discussed above with respect to FIG. 3B. Furthermore, as also discussed above with respect to FIGS. 3B and 3C, the lenses 306 and 304 and/or of lenses 706 and 704 can be moved toward or away from each other to minimize the distance between the lenses of the system during any lateral shift or slide while avoiding mechanical interference between the lenses. In accordance with exemplary embodiments, the maximum lateral shift can be at least 5 times as large as any change in distance between the lenses. Here, any change in distance between the lenses should serve to minimize the mechanical gap between the lenses. However, as noted above, in the interest of simplicity of the mechanical actuator, the distance between the lenses can be maintained constant through any lateral shift.

The processor 410/810, at step 3204, can control the actuator 408/808 to implement the relative slide between lenses 306 and 304 or of lenses 706 and 704 to reach a relative slide position implementing a size, angle and/or configuration received at step 3202. As noted above, the processor 410/810 can employ a table or function to determine the appropriate relative slide position. Alternatively or additionally, the processor 410/810 can control the actuator 408/808 to implement the relative slide between lenses 306 and 304 or of lenses 706 and 704 to reach a relative slide position received at step 3202 or the relative slide position resulting from a specific lens adjustment received at step 3202. Alternatively or additionally, the processor 410/810 can control the actuator 408/808 to implement the relative slide between lenses 306 and 304 or of lenses 706 and 704 to reach a relative slide position in accordance with a program of sizes, angles and/or configurations that change over time stored in the memory 414/814, as noted above. Here, the actuator 408/808 can move one or both of lenses 306 and 304 or one or both of lenses 706 and 704 linearly as discussed above with respect to the structures 302 and 702. Further, the actuator 408/808 can move one or both of lenses 306 and 304 or one or both of lenses 706 and 704 in either horizontal direction to reach the relative slide position according to the beam adjustment indication(s) received at step 3202.

At step 3206, the processor 410/810 can control the light source 402/802 to generate the light output beam 420/820 in device 400/800 with the lenses 306 and 304 or with lenses 706 and 704 as discussed above. Here, the generation of the light beam 420/820 at step 3206 can be implemented before, after or simultaneously with step 3202 and/or step 3204. As discussed above, the light source 402/802 preferably outputs collimated light 404/804. In addition, the processor 410/810 can control the light source 402/802 to adjust or change the color, color temperature or intensity to implement any color, color temperature or intensity received at step 3202, which can, for example, change over time in accordance with a program, as noted above.

Figure 17:
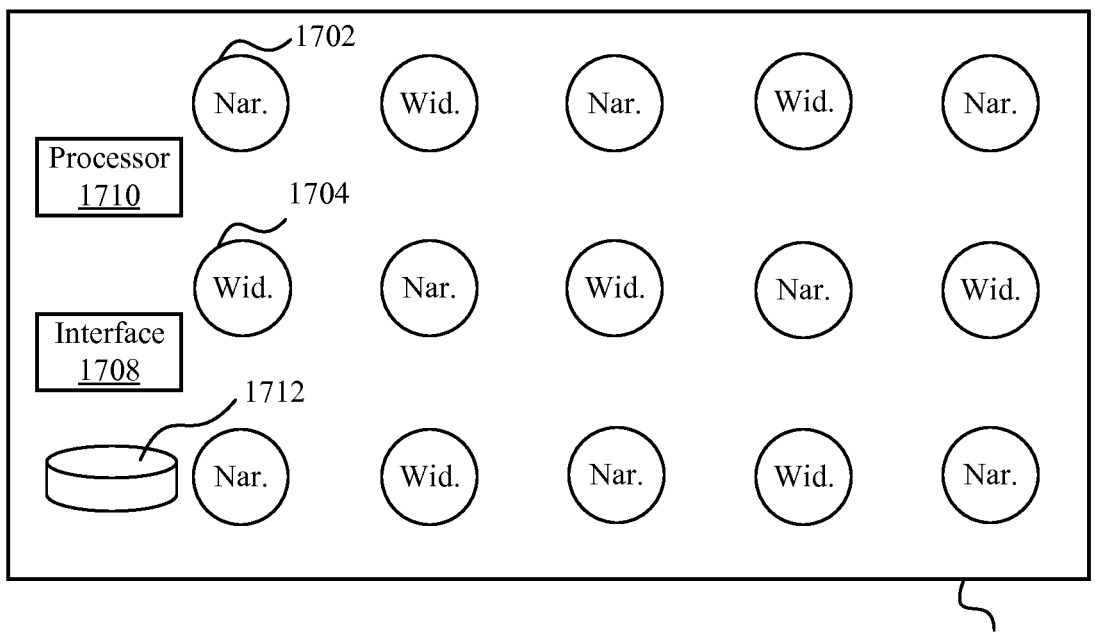
FIG. 17 is a high level-block diagram of a lighting system for providing a light output beam in accordance with exemplary embodiments.

Turning now to FIG. 17, a lighting system 1706 for providing a light output beam is illustratively depicted. The system 1706 can achieve a wide dynamic range of beam angles by employing several groups of lighting devices, where each lighting device provides its own respective beam angle. In addition, the system 1706 can employ dimming with variable focus lenses to smoothly transition between a narrow beam angle and a medium and/or wide beam angle. The system 1706 can provide an enhanced dynamic range of the output beam. In the example illustrated in FIG. 17, the system 1706 includes two groups of lighting devices. For example, the system 1706 can include lighting devices 1702 that provide a narrow (nar.) beam angle and lighting devices

1704 that provide a wide (wid.) beam angle. For example, each of the lighting devices 1702 can output a light beam having a profile 1802 illustrated in FIG. 18 with an angle ranging from, for example, 15 to 40 degrees, while each of the lighting devices 1704 can output a light beam having a batwing profile 2202 illustrated in FIG. 22 with an angle ranging from, for example, 40 to 85 degrees. The batwing profile can be implemented by directing, from light source 402 or 802, uncollimated light into lens structure 302 or 702, or by directing, from light source 402 or 802, a ring of collimated light with an empty center to the lens structure 302 or 702. It should be understood that, although only two groups of lighting devices (nar. and wid.) are illustrated, a larger number of different groups of lighting devices can be employed.

It should be noted that the lighting device 400 of FIG. 4 and the lighting device 800 of FIG. 8 can implement any one or more of the lighting devices 1702 and 1704. For example, all of the lighting devices 1702 and 1704 of system 1706 can be structured as the lighting device 400, all of the lighting devices 1702 and 1704 of system 1706 can be structured as the lighting device 800, some of the lighting devices 1702 can be structured as the lighting device 800 and other lighting devices 1702 can be structured as the lighting device 400, and some of the lighting devices 1704 can be structured as the lighting device 800 and other lighting devices 1704 can be structured as the lighting device 400.

Further, the system 1706 includes a processor 1710, a memory or storage device 1712 and an interface 1708. In accordance with one exemplary embodiment, the processor 1710 can control each of the lighting devices 1702 and 1704 based on instructions received through the interface 1708 or stored in memory 1712. The interface 1708 can be an interface connected to another computing device or processor directly or through a network, or can be a user-interface. For example, the user-interface can be a touch-screen, a keyboard, a touch pad, or one or more of any suitable variety of user-interfaces. According to one exemplary aspect, as user may enter or select an indication of a desired beam structure or angle. In turn, the memory 1712 can include data describing the relationship between beam structures and beam angles to corresponding relative shifts between lenses 304 and 306 and/or lenses 704 and 706. In addition, the processor 1710 can control all of the lighting devices 1702 and 1704 in the system 1706 by communicating with each of the processors 410/810 of the lighting devices 1702 and 1704, or the processor 1710 can perform the same functions of the processors 410/810 of the lighting devices 1702 and 1704 described above, where in this case the processors 410/810 can optionally be omitted. Similarly, the memory 1712 can perform the same functions of and store the same information as the memories 414/814 of the lighting devices 1702 and 1704 described above, where the memories 414/814 can optionally be omitted, and the interface 1712 can perform the same functions of the interfaces 414/814 of the lighting devices 1702 and 1704 described above, where the interfaces 414/814 can also optionally be omitted. Details of the processor 1710 and the memory 1712 are further discussed herein below with respect to the method 3300 of FIG. 33.

To illustrate how beams of different widths can be smoothly combined using variable-focus lenses in accordance with exemplary embodiments of the system 1700, reference is initially made to FIGS. 18 and 19. FIG. 18 illustrates the profile 1802 of a beam having a full width at half maximum (FWHM) beam angle of 15 degrees, while FIG. 19 illustrates the profile 1902 of a beam having a FWHM beam angle of 32 degrees. In FIGS. 18 and 19, as well as FIGS. 20-31, the vertical axis denotes intensity in candela, while the horizontal axis denotes a beam angle in degrees. Each beam denoted by profiles 1802 and 1902 can be generated by a single LED with an optic or lens above it. In addition, the beams can be added by turning on both light sources and aiming them in the same direction so that their light is superimposed when they are shined onto the same surface. FIG. 20 illustrates a beam profile 2002 that is composed of the beam having profile 1802 added with the beam having the profile 1902. As shown in FIG. 20, merely adding the beams 1802 and 1902 does not create a desirable or smooth beam shape and an unaesthetic inflection point 2004 is formed by adding the two beams.

To improve the addition of beams having different widths, the beams should preferably have different shapes that accommodate and blend with each other. For example, FIG. 21 illustrates a beam with a narrow profile 2102 having a central peak with a FWHM of 15 degrees and FIG. 22 illustrates a complementary beam having a batwing-type profile 2202 with two peaks. As illustrated in FIG. 23, adding beams 2102 with 2202 results in a beam profile 2302, which has a smooth and aesthetically pleasing profile with a beam angle of 45 degrees. Although the beam profiles 2102 and 2202 can be added together to form a smooth beam profile 2302, it is difficult to produce beams having other widths, such as, for example, a beam having profile 2304, using the same lighting devices. In other words, it is difficult to produce an adjustable beam having smooth profiles across various beam angles and structures.

In accordance with an aspect of exemplary embodiments, the beam profiles are adjusted in tandem to ensure that various beam structures blend smoothly when superimposed. For example, FIGS. 24 and 25 the narrow and batwing beam profiles after the narrow beam is adjusted but the batwing profile is maintained the same. In turn, FIG. 26 shows a beam profile 2602 resulting from the superimposition of the narrower beam profile 2402 with the batwing profile 2502. The beam profile 2602 does not have a smooth beam shape and includes an unaesthetic inflection point 2604. Thus, the narrow beam and the wide beam (e.g., batwing profile beam) should be adjusted in a way ensuring that their superposition maintains compatibility for purposes of generating a smooth beam structure.

Exemplary embodiments of the present application can be configured to adjust superimposed beams independently such that they produce matching profiles. For example, with reference to FIGS. 27 and 28, with continuing reference to FIG. 17, the narrow beam structure 2702 provided by lighting device 1702 and the wide beam structure 2802 provided lighting device 1704 can be adjusted such that the width 2704 maintains a superposition with the width 2804. In other words, any beam adjustment is performed in such a way that the peaks, denoted by the ends of width 2804, of the batwing profile 2802 overlap the outer boundaries, denoted by the ends of width 2704, of the narrow beam 2702, where the narrow beam 2702 is close to zero intensity. In particular, the profile 2702 reaches nearly zero intensity angles X and −X, while the profile 2802 has peaks at the same angles X and −X. Matching and overlapping the peaks of profile 2802 with the ends of the beam 2702 in this way can ensure a smooth blend, as illustrated in FIG. 29.

In some cases, the user may desire a beam angle that is so narrow that it does not need the batwing portion of the beam. In that case, the batwing assemblies, which can, for example, be implemented by lighting devices 1704, would be turned off. The system 1700 can still adjust the narrow beam provided by lighting devices 1702, as discussed in detail above with respect to method 3200.

In accordance with another exemplary aspect, the system 1700 can blend and superimpose the narrow beam structures provided by lighting devices 1702 with the wide beam structures provided by lighting devices 1704 by scaling the beam structures in terms of both intensity and angle. Thus, the adjustment procedure can therefore include a brightness adjustment on one or both portions of the beam pattern, for example a brightness adjustment on the narrow beam structures provided by lighting devices 1702, the wide beam structures provided by lighting devices 1704, or both the narrow beam structures provided by lighting devices 1702 and the wide beam structures provided by lighting devices 1704 to accommodate smooth mixing. The intensity adjustment can be achieved by the processor 1710, 410 and/or 710 by electronically modulating the power provided to the light source 402/802, which can comprise one or more LEDs, for example, by appropriately changing the duty cycle. FIGS. 30 and 31 illustrate poorly matched narrow beam profiles 3002/3102 with corresponding wide beam profiles 3004/3104. Preferably, the intensities of the narrow and wide beam profiles should be matched as illustrated in FIG. 29.

Figure 33:
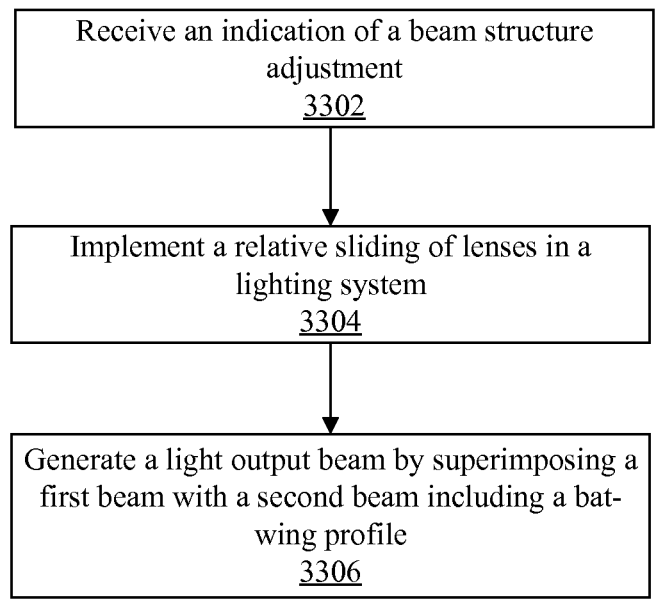
FIG. 33 is a high-level flow diagram of an additional method for providing a light output beam in accordance with exemplary embodiments.

Referring now to FIG. 33, an exemplary method 3300 for providing a light output beam in accordance with exemplary embodiments is illustratively depicted. It should be noted that the method 3300 can be performed by the system 1700 and can incorporate all of the aspects of the system 1700 described above or any combination of aspects of the system 1700 described above. The method 1700 can be performed by the processor 1710 alone or in combination with processors 410 and/or 810 of the lighting devices 1702 and the lighting devices 1704 of the system 1700. The method 3300 can begin at step 3302, at which the processor 1710/410/810 can receive an indication of a beam structure adjustment through the interface 1708. Here, the interface can be a user-interface such as, for example, a touch screen, a keyboard, a mouse, a keypad, a remote control interface that can communicate wirelessly to a remote control or any other appropriate user-interface through which a user may provide the system 1700 with an indication of a beam structure adjustment. Alternatively or additionally, the interface 1710 may be an interface that is coupled to another computing device. For example, the interface 1710 may be a hardware port coupled directly to another computing device or coupled to a network to which the other computing device is coupled. Alternatively, the interface 1710 can be a wireless interface coupled directly to another computing device or coupled to a network to which the other computing device is coupled. The network in both cases can be a wired network, a wireless network or a combination of a wired and wireless network, and can further comprise the internet and/or a cloud system, of which the other computing device can be a part, in each of these cases. Here, the other computing device can remotely control the lighting system 1700 and can provide the indication of the beam structure adjustment as part of a program stored at the computing device or elsewhere in the network or cloud, or can provide the indication of the beam structure adjustment by relaying an input provided by a user.

The beam structure adjustment can be an adjustment of the size, angle, color, color temperature, intensity and/or configuration (e.g., shape) of the beam. In addition, sizes, angles and/or configurations of the beam can be correlated to respective relative slide positions between the lenses 304 and 306 in the memory 1712 for one or more of devices 1702 and/or devices 1704, and/or sizes, angles and/or configurations of the beam can be correlated to respective relative slide positions between the lenses 704 and 706 in the memory 1712 or one or more of devices 1702 and/or devices 170. For example, the memory 1714 can include a table relating relative slide positions to sizes, angles and/or configurations such that the processor 1710/410/810 can receive a particular size, angle and/or configuration and can determine the appropriate relative slide position to implement the received size, angle and/or configuration of the beam by correlating the received size, angle and/or configuration to the appropriate relative slide position in the table. Here, if the received size, angle and/or configuration is not precisely defined in the table, the processor 1710/410/810 can be configured to select the relative slide position correlated to the size, angle and/or configuration that is most similar to the received size, angle and/or configuration. Alternatively or additionally, the relationship between sizes, angles and/or configurations and relative slide positions can be defined as a function. Furthermore, in addition to or as an alternative to a size, angle and/or configuration, the indication of the beam adjustment can be an indication of the relative slide position or an indication of the lens slide adjustment itself. Moreover, the indication can be a code denoting a size, angle, color, color temperature, intensity and/or configuration (e.g., shape) of the beam, a relative slide position that will implement a desired size, angle and/or configuration and/or the lens slide adjustment that would lead to a relative slide position that will implement a desired size, angle and/or configuration. Alternatively or additionally, the indication of a beam structure adjustment received at step 3302 can be a program including a set of sizes, angles, colors, color temperatures, intensities and/or configurations that change over time, relative slide positions of the lenses 306 and 304 or the relative slide positions between lenses 706 and 704 that change over time, and/or lens slide adjustments that are implemented at different times according to the program. Additionally, it should also be noted that the indication of the beam structure adjustment can define an initial beam structure or can define an adjustment to an existing light beam. In each of these cases, the slide of the lenses of the device(s) 1702 and the slide of the lenses of device(s) 1704 can be correlated and performed in tandem such that overlap between peaks of the batwing profile and outer boundaries of the first beam is maintained. Furthermore, in each of these cases the slide can be correlated to a corresponding intensity adjustment of the light source 402/802 in each of the devices 1702 and 1704. In accordance with one exemplary aspect, the intensity adjustment(s) can be correlated in the memory 1712/414/814 to the slide position(s) to obtain a desired beam profile such as, for example, the profile formed by beams 2702 and 2802 in FIG. 29. Alternatively or additionally, the intensity adjustment(s) can be correlated in the memory 1712/414/814 to the slide position(s) to obtain a desired beam profile(s) having unconventional shape(s) such as, for example, the profile 2602 in FIG. 26.

As noted above, the lighting device(s) 1702 can form narrow beam structures 2102/2702 while lighting device(s) 1704 can form beam structures with batwing profiles 2202/2802. Here, through any of the sliding adjustments of lenses, the processor 1710/410/810 can be configured to perform the slide adjustment in such a way that the peaks, denoted by the ends of width 2804, of the batwing profile 2802 overlap the outer boundaries, denoted by the ends of width 2704, of the narrow beam 2702, where the narrow beam 2702 is close to zero intensity, as discussed in detail above. Furthermore, if the indication received at step 3302 includes an intensity adjustment, the memory 1712/414/814 can correlate intensities that are formed by superposition of the narrow and wide beam structures to intensities of the individual light sources 402/802 of the devices 1702/1704. In particular, the intensities of the individual light sources 402/802 of the devices 1702/1704 can be configured such that they are matched to form a smooth beam structure, as discussed above with respect to FIGS. 29-31, and form various intensities that may be selected through the indication received at step 3302.

At step 3304, the processor 1710/410/810 can control the actuator 408/808 to implement a relative sliding of lenses 306 and 304 and/or of lenses 706 and 704 in the lighting system 1700 to perform the beam structure adjustment(s) received at step 3302 and thereby adjust the structure of the output beam. As stated above, the actuator 408/808 can implement the relative slide or shift of the lenses 306 and 304 and/or of lenses 706 and 704 in the lateral direction, as discussed above with respect to FIG. 3B. Furthermore, as also discussed above with respect to FIGS. 3B and 3C, the lenses 306 and 304 and/or of lenses 706 and 704 can optionally be moved toward or away from each other to minimize the distance between the lenses of the system during any lateral shift or slide while avoiding mechanical interference between the lenses. In accordance with exemplary embodiments, as noted above, the maximum lateral shift can be at least 5 times as large as any change in distance between the lenses.

The processor 1710/410/810, at step 3304, can control the actuator 408/808 to implement the relative slide between lenses 306 and 304 and/or of lenses 706 and 704 to reach a relative slide position implementing a size, angle and/or configuration received at step 3302. As noted above, the processor 1710/410/810 can employ a table or function to determine the appropriate relative slide position. Alternatively or additionally, the processor 1710/410/810 can control the actuator 408/808 to implement the relative slide between lenses 306 and 304 and/or of lenses 706 and 704 to reach a relative slide position received at step 3302 or the relative slide position resulting from a specific lens adjustment received at step 3302. Alternatively or additionally, the processor 1710/410/810 can control the actuator 408/808 to implement the relative slide between lenses 306 and 304 and/or of lenses 706 and 704 to reach a relative slide position in accordance with a program of sizes, angles and/or configurations that change over time stored in the memory 1712/414/814, as noted above. Here, the actuator 408/808 can move one or both of lenses 306 and 304 and/or one or both of lenses 706 and 704 linearly as discussed above with respect to the structures 302 and 702. Further, the actuator 408/808 can move one or both of lenses 306 and 304 and/or one or both of lenses 706 and 704 in either horizontal direction to reach the relative slide position according to the beam adjustment indication(s) received at step 3302.

At step 3306, the processor 1710/410/810 can control the light source 402/802 to generate the light output beam by superimposing a first beam with a second beam including a batwing profile. Here, the generation of the light output beam at step 3306 can be implemented before, after or simultaneously with step 3302 and/or step 3304. As discussed above, a light beam 2102/2702 provided by lighting device 1702 can be superimposed on a light beam 2202/2802. To ensure a smooth superimposed beam profile in accordance with exemplary embodiments, the processor 1710/410/810 can be configured to perform any of the slide adjustments in such a way that the peaks, denoted by the ends of width 2804, of the batwing profile 2802 overlap the outer boundaries, denoted by the ends of width 2704, of the narrow beam 2702, where the narrow beam 2702 is close to zero intensity, as discussed in detail above. In addition, the processor 1710/410/810 can control the light source 402/802 to adjust or change the color, color temperature, intensity to implement any color, color temperature or intensity received at step 3202, which can, for example, change over time in accordance with a program, as noted above. Moreover, as noted above, the intensities of the individual light sources 402/802 of the devices 1702/1704 can be configured such that they are matched to form a smooth beam structure, as discussed above with respect to FIGS. 29-31.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of," or "exactly one of" "Consisting essentially of" when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A lighting device providing an output beam comprising:
    a light source configured to output light; and
    a plurality of lenses including a first lens having a first freeform surface configured to receive the light and a second freeform surface configured to transmit the light towards a second lens of the plurality of lenses, the second lens including a third freeform surface configured to receive the light from the second freeform surface and including a fourth freeform surface configured to transmit the light out of the second lens;
    wherein each of the first lens and second lens is coupled to a relative slide in a lateral direction that is parallel to at least one plane in which at least one of the first or second lenses is predominantly disposed to adjust a structure of the output beam, wherein the structure includes one of size, angle, color, color temperature, intensity and/or shape of the output beam; and
    a diffuser configured to receive and diffuse the light transmitted out of the second lens.

2. The lighting device of claim 1, wherein the light output from the light source and received by the first freeform surface is collimated light.

3. The lighting device of claim 1, wherein the second freeform surface and the third freeform surface have an identical geometry.

4. The lighting device of claim 1, wherein at least one given freeform surface of said first, second, third and fourth freeform surfaces has a same geometry as at least one other freeform surface of said first, second, third and fourth freeform surfaces except that an edge of the at least one given freeform surface has a steeper geometry than a corresponding edge on the at least one other freeform surface.

5. The lighting device of claim 1, further comprising:
    a processor configured to receive an indication of a beam structure adjustment and to implement the relative slide to adjust the structure of the output beam.

6. The lighting device of claim 5, wherein the processor is configured to implement adjustments of only positive powers.

7. The lighting device of claim 1, further comprising:
    a diffuser configured to receive and diffuse the light transmitted out of the second lens.

8. The lighting device of claim 1, wherein the first and second lenses each include at least two of a positive optical power portion, a negative optical power portion and a zero optical power portion.

9. A lighting system providing an output beam comprising:
    a plurality of lighting devices including
    a first lighting device configured to generate a first beam, and
    a second lighting device configured to generate a second beam including a bat-wing profile,
    wherein at least one of the first and second lighting devices or the second light-emitting device comprises a light source and a plurality of lenses including a first lens having a first freeform surface and a second lens including a second freeform surface,
    wherein the system is configured to superimpose the first beam and the second beam when the first and second lighting devices are activated; and
    wherein peaks of the batwing profile overlap outer boundaries of the first beam.

10. The lighting system of claim 9, further comprising:
    a processor configured to receive an indication of a beam structure adjustment and to implement a relative slide between the first and second lenses to adjust a structure of the output beam, wherein the relative slide is implemented in a lateral direction that is parallel to at least one plane in which at least one of the first or second lenses is predominantly disposed.

11. The lighting system of claim 10,
    wherein the light source is a first light source, wherein the plurality of lenses is a first plurality of lenses, wherein the first light emitting device includes the first light source and the first plurality of lenses,
    wherein the second lighting device comprises a second light source and a second plurality of lenses including a third lens having a third freeform surface and a fourth lens having a fourth freeform surface, wherein the processor is configured to implement the adjustment by sliding at least one of the first, second, third or fourth lenses such that overlap between peaks of the batwing profile and outer boundaries of the first beam is maintained, wherein the sliding is implemented in the lateral direction.

12. The lighting system of claim 11, wherein the processor is configured to alter an intensity of at least one of the first beam or the second beam to implement the adjustment.

13. A method for providing a light output beam comprising:
receiving an indication of a beam structure adjustment;
implementing a relative slide between a first lens and a second lens to adjust a structure of the output beam, wherein the structure includes one of size, angle, color, color temperature, intensity and/or shape of the output beam; wherein the first lens includes a first freeform surface configured to receive light from a light source and a second freeform surface configured to transmit the light towards the second lens, the second lens including a third freeform surface configured to receive the light from the second freeform surface and a fourth freeform surface configured to transmit the light out of the second lens, wherein the relative slide is implemented in a lateral direction that is parallel to at least one plane in which at least one of the first or second lenses is predominantly disposed; and
generating the light output beam with the light transmitted out of the second lens.

14. The method of claim 13, wherein the implementing comprises adjusting a width of the output beam.

15. A method for providing a light output beam comprising:
receiving an indication of a beam structure adjustment;
implementing a relative slide between a first lens and a second lens to adjust a structure of the output beam, wherein the relative slide is implemented in a lateral direction that is parallel to at least one plane in which at least one of the first or second lenses is predominantly disposed; and
generating a first beam by a first lighting device and a second beam by a second lighting device, wherein the second beam includes a bat-wing profile, wherein at least one of the first and second lighting devices comprises a light source and a plurality of lenses including the first lens and the second lens, wherein the first lens includes a first freeform surface and the second lens includes second freeform surface, and wherein the generating is performed such that the first beam and the second beam are superimposed, wherein peaks of the batwing profile overlap outer boundaries of the first beam.

* * * * *